US009689277B2

(12) United States Patent
Klusman

(10) Patent No.: US 9,689,277 B2
(45) Date of Patent: *Jun. 27, 2017

(54) GAS TURBINE ENGINE AND FOIL BEARING SYSTEM

(71) Applicant: Rolls-Royce Corporation, Indianapolis, IN (US)

(72) Inventor: Steven A. Klusman, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,039

(22) Filed: Jan. 15, 2016

(65) Prior Publication Data
US 2016/0201508 A1   Jul. 14, 2016

Related U.S. Application Data

(63) Continuation of application No. 12/974,961, filed on Dec. 21, 2010, now Pat. No. 9,238,973.
(Continued)

(51) Int. Cl.
*F01D 25/16* (2006.01)
*F01D 25/22* (2006.01)
(Continued)

(52) U.S. Cl.
CPC .......... *F01D 25/16* (2013.01); *F01D 25/166* (2013.01); *F01D 25/22* (2013.01); *F16C 17/024* (2013.01);
(Continued)

(58) Field of Classification Search
CPC .... F16C 17/024; F04D 29/056; F04D 29/057; F05D 2240/53; F05D 2240/54
See application file for complete search history.

(56) References Cited

U.S. PATENT DOCUMENTS 3,173,696 A   3/1965   Reinhardt et al.
3,302,048 A   1/1967   Gray
(Continued)

FOREIGN PATENT DOCUMENTS

CN   101280801 A   10/2008
EP   0187486 A1   7/1986
JP   2009299748 A   12/2009

OTHER PUBLICATIONS

Howard, S.A., "Misalignment in Gas Foil Journal Bearings: An Experimental Study," Glenn Research Center, Cleveland, Ohio, NASA/TM-2008-215223, Turbo Expo 2008, May 2008, 17pgs.
(Continued)

*Primary Examiner* — Gregory Anderson
*Assistant Examiner* — Maxime Adjagbe
(74) *Attorney, Agent, or Firm* — Duane Morris LLP

(57) ABSTRACT

A gas turbine engine including a compressor, a turbine and a static structure is disclosed herein. The gas turbine engine further includes a foil bearing system operative to transmit rotor loads from at least one of the compressor and the turbine to the static structure. The foil bearing system includes a foil bearing and a self-aligning foil bearing mount to align the foil bearing with an axis of rotation of the compressor and the turbine. A snubber operative to transmit rotor loads to the static structure in parallel with the foil bearing is also disclosed.

20 Claims, 1 Drawing Sheet

Related U.S. Application Data

(60) Provisional application No. 61/290,852, filed on Dec. 29, 2009.

(51) Int. Cl.
*F16C 17/02* (2006.01)
*F16C 23/04* (2006.01)

(52) U.S. Cl.
CPC ........ *F16C 23/045* (2013.01); *F05D 2230/64* (2013.01); *F05D 2240/50* (2013.01); *F05D 2240/53* (2013.01); *F05D 2250/241* (2013.01); *F16C 2360/23* (2013.01); *Y02T 50/672* (2013.01)

(56) References Cited

U.S. PATENT DOCUMENTS

| | | | |
|---|---|---|---|
| 3,345,035 A | 10/1967 | Johnson et al. | |
| 3,467,451 A | 9/1969 | Marley | |
| 3,807,819 A | 4/1974 | Zimmer et al. | |
| 3,809,443 A * | 5/1974 | Cherubim | F16C 17/024 384/106 |
| 4,361,416 A | 11/1982 | Rossmann | |
| 4,402,618 A | 9/1983 | Fortmann et al. | |
| 4,502,795 A | 3/1985 | Klaass et al. | |
| 5,087,176 A | 2/1992 | Wieland | |
| 5,399,024 A | 3/1995 | Shapiro | |
| 5,403,154 A | 4/1995 | Ide | |
| 5,449,235 A | 9/1995 | Buckmann | |
| 5,718,517 A * | 2/1998 | Morando | F16C 23/046 384/192 |
| 5,911,511 A * | 6/1999 | Saville | F16C 17/024 384/103 |
| 5,921,683 A | 7/1999 | Merritt et al. | |
| 8,360,645 B2 | 1/2013 | Omori | |
| 2002/0097928 A1 | 7/2002 | Swinton et al. | |
| 2005/0089392 A1 | 4/2005 | Lubell et al. | |
| 2007/0058890 A1 | 3/2007 | Al-Bender | |
| 2007/0230844 A1 * | 10/2007 | King | F16C 11/0614 384/192 |
| 2008/0152477 A1 | 6/2008 | Moniz et al. | |
| 2009/0185766 A1 | 7/2009 | Dubreuil et al. | |
| 2009/0304313 A1 | 12/2009 | Ertas | |

OTHER PUBLICATIONS

International Searching Authority, International Search and Written Opinion for corresponding application PCT/US2010/062376, mailed Dec. 8, 2011, 8pgs.

Chinese Patent Office, Chinese First Office Action for corresponding Application No. CN201080064883.2, mailed Mar. 17, 2014, 19pgs.

Chinese Patent Office, Chinese Third Office Action for corresponding Application No. CN201080064883.2, mailed Apr. 16, 2015, 16pgs.

European Patent Office, Supplementary Partial European Search Report for corresponding EP Application No. 10851163 dated Sep. 15, 2016, 1pg.

* cited by examiner

GAS TURBINE ENGINE AND FOIL BEARING SYSTEM

CROSS REFERENCE TO RELATED APPLICATIONS

The present application claims the benefit of U.S. Provisional Patent Application 61/290,852, filed Dec. 29, 2009 and is a continuation of U.S. patent application Ser. No. 12/974,961, filed Dec. 21, 2010, both of which are incorporated herein by reference.

GOVERNMENT RIGHTS

The present application was made with United States government support under contract no. N00014-04-D-0068-002, awarded by the United States Navy. The United States government may have certain rights in the present application.

FIELD OF THE INVENTION

The present invention relates to gas turbine engines, and more particularly, to a gas turbine engine foil bearing system.

BACKGROUND

Foil bearing systems in gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique gas turbine engine foil bearing system. Other embodiments include apparatuses, systems, devices, hardware, methods, and combinations for gas turbine engines and gas turbine engine bearing systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
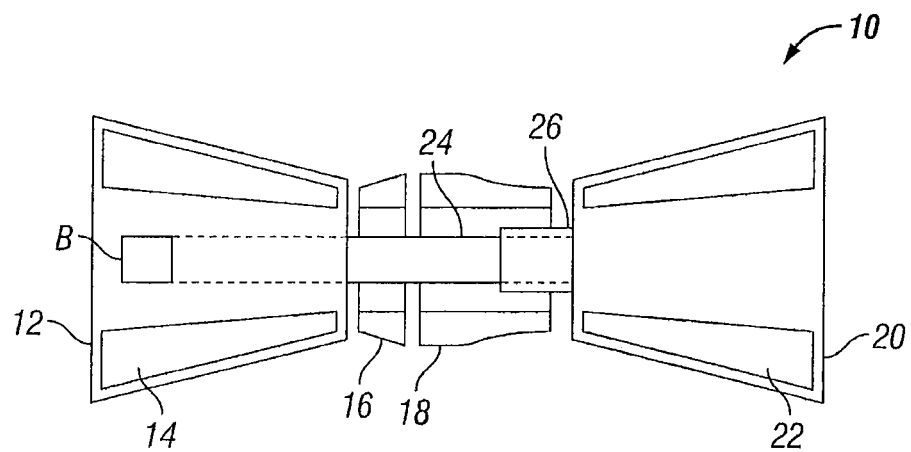
FIG. 1 schematically illustrates a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood, that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of a gas turbine engine 10 in accordance with an embodiment of the present invention is schematically depicted. In one form, gas turbine engine 10 is an axial flow machine, e.g., an air-vehicle power plant. In other embodiments, gas turbine engine 10 may be a radial flow machine or a combination axial-radial flow machine. It will be understood that the present invention is equally applicable to various gas turbine engine configurations, for example, including turbojet engines, turbofan engines, turboprop engines, and turboshaft engines having axial, centrifugal and/or axi-centrifugal compressors and/or turbines.

In the illustrated embodiment, gas turbine engine 10 includes a compressor 12 having a plurality of blades and vanes 14, a diffuser 16, a combustor 18, a turbine 20 having a plurality of blades and vanes 22, and a shaft 24 coupling compressor 12 with turbine 20. Combustor 18 is in fluid communication with compressor 12 and turbine 20. Turbine 20 is drivingly coupled to compressor 12 via shaft 24. Turbine 20 is supported radially by a foil bearing system 26. Although only a single spool is depicted, it will be understood that the present invention is equally applicable to multi-spool engines. The number of stages of blades and vanes 14 of compressor 12, and the number of blades and vanes 22 of turbine 20 may vary with the application, e.g., the power output requirements of a particular installation of gas turbine engine 10. In various embodiments, gas turbine engine 10 may include one or more fans, additional compressors and/or additional turbines.

During the operation of gas turbine engine 10, air is received at the inlet of compressor 12. Blades and vanes 14 compress the air received at the inlet of compressor 12. Diffuser 16 is positioned downstream of compressor 12. Diffuser 16 reduces the velocity of the pressurized air discharged from compressor 12. After having been compressed and diffused, the air is discharged from diffuser 16 into combustor 18. The pressurized air is then mixed with fuel and combusted in combustor 18. The hot gases exiting combustor 18 are directed into turbine 20. Turbine 20 extracts energy from the hot gases to, among other things, generate mechanical shaft power to drive compressor 12 via shaft 24. In one form, shaft 24 is coupled to compressor 12 and turbine 20. In other embodiments, shaft 24 may be coupled to only one of compressor 12 and turbine 20, and may be integral with the other. In still other embodiments, shaft 24 may be integral with both compressor 12 and turbine 20. In one form, the hot gases exiting turbine 20 are directed into a nozzle (not shown), and provide a thrust output for gas turbine engine 10. In other embodiments, additional compressor and/or turbine stages in one or more additional rotors upstream and/or downstream of compressor 12 and/or turbine 20 may be employed, e.g., in single or multi-spool gas turbine engines.

Foil bearing system 26 is operative to react and transmit rotor loads from a rotor to another structure. In one form, foil bearing system 26 is operative to react and transmit loads from a rotor to a static engine structure. In other embodiments, foil bearing system 26 is operative to react and transmit loads from one rotor to another rotor. Rotor loads may include radial and thrust loads resulting from rotor weight and inertial loading, as well as pressure/thrust loading and dynamic loading. In the illustrated example, foil bearing system 26 reacts radial loads from turbine 20, whereas another bearing system B supports compressor 12 and reacts radial and thrust loads. In other embodiments, foil bearing system 26 may support compressor 12 in addition to or in place of turbine 20. In one or more of various embodiments, foil bearing system 26 may react radial and/or thrust loads for all or part of any rotor system of a gas turbine engine such as engine 10.

Figure 2:
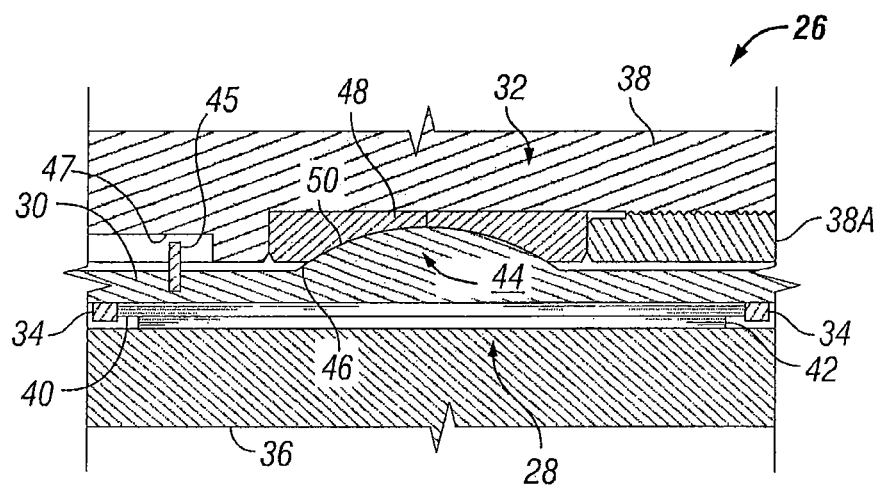
FIG. 2 schematically illustrates a foil bearing system in accordance with an embodiment of the present invention.

Referring now to FIG. 2, a non-limiting example of foil bearing system 26 in accordance with an embodiment of the present invention is schematically depicted. Foil bearing system 26 includes a foil bearing 28, a bearing housing 30, a self-aligning foil bearing mount 32 and two offset snubbers 34. In one form, foil bearing system 26 is operative to transmit loads from a rotor 36 to a static engine structure 38, such as an engine case structure or other rotor support structure. In one form, rotor 36 is a turbine rotor. In other embodiments, rotor 36 may be a compressor rotor. In one form, shaft 24 is considered to be part of rotor 36, and in such embodiments, foil bearing system 26 may be positioned about shaft 24 to react rotor 36 loads via shaft 24. In other embodiments, foil bearing system may be positioned to react loads directly from compressor 12 and/or turbine 20 directly. In one form, foil bearing system 26 is positioned adjacent to turbine 20 in order to react to the turbine 20 loads and transmit the loads to static engine structure 38. In other embodiments, foil bearing system 26 may be positioned adjacent to compressor 12 or in other locations to react and transmit loads from compressor 12 and/or other rotating components of engine 10. In still other embodiments, foil bearing system 26 may react and transmit rotor loads from one rotor to another rotor of a gas turbine engine.

Foil bearing 28 is a gas bearing. In one form, foil bearing 28 is a compliant foil air bearing. In one form, foil bearing 28 includes a bump foil 40 and a plurality of hydrodynamic foils, referred to herein as a top foils 42. In some embodiments, a plurality of bump foils 40 may be employed in foil bearing 28. In some embodiments, only a single top foil 42 may be employed. In one form, top foils 42 are preloaded against rotor 36, e.g., using a spring (not shown). In other embodiments, top foils 42 may not be preloaded, or may be preloaded by virtue of the shape of each top foil 42. Other types of foil bearings may be used in other embodiments. Bump foil 40 and top foils 42 are disposed within housing 30.

Rotor 36 forms a journal employed by foil bearing 28. Rotation of engine rotor 36 generates a hydrodynamic air film between rotor 36 and top foil 42. The hydrodynamic air film thickness and load bearing capacity increase with the rotational speed of rotor 36. During startup of engine 10, top foil 42 rubs against rotor 36 until the hydrodynamic air film pressure is sufficient to overcome the supported rotor 36 loads and any preload. At normal operating speeds, the hydrodynamic air film separates rotor 36 and top foil 42, thereby preventing contact between rotor 36 and top foil 42 during normal engine operation. The hydrodynamic air film supports engine rotor 36. Rotor 36 loads are transmitted through the hydrodynamic air film to top foil 42. Top foil 42 is supported by bump foil 40, which transmits the loads to housing 30, and also provides additional compliance to foil bearing 28. The loads are transmitted from housing 30 to static structure 38 via self-aligning foil bearing mount 32.

In one form, self-aligning bearing mount 32 is a rigid structure. In other embodiments, self-aligning bearing mount 32 may be configured to achieve a desired compliance and/or accommodate varying degrees of thermal expansion. For example, in some embodiments, self-aligning bearing mount 32 may have a cross-sectional shape configured to function as a spring, and/or may incorporate one or more springs in order to achieve the desired compliance and/or accommodate anticipated thermal expansion. Self-aligning bearing mount 32 includes a crown 44 that extends radially outward from bearing housing 30. Crown 44 includes a crown surface 46. In one form, crown surface 46 is a load bearing surface. In one form, crown surface 46 is spherical. Crown surface 46 may be an interrupted surface, e.g., such as embodiments wherein the tip of crown 44 is cylindrical or another non-spherical shape. In other embodiments, crown surface 46 may not be spherical, but may be any shape having spherical and/or non-spherical portions that are suited to the particular application. In one form, crown 44 is integral with housing 30. In other embodiments, crown 44 may be formed separately and affixed to housing 30.

Self-aligning foil bearing mount 32 also includes a receiver 48 coupled to foil bearing 28 via crown 44 and housing 30. Self-aligning foil bearing mount 32 is formed of both crown 44 and receiver 48. Receiver 48 is disposed in static structure 38. In one form, receiver 48 is split to as to allow assembly with crown 44. In one form, receiver 48 is installed into static structure 38. In a particular form, receiver 48 is secured in static structure 38 by a threaded nut 38A. Other embodiments may employ other means of securing receiver 48. In still other embodiments, receiver 48 may be partially or fully integral with static structure 38. In some embodiments, receiver 48 may be anti-rotated by means not shown (as opposed to the threaded nut 38A in the illustrated embodiment which can be used to provide sufficient force to hold the split receiver 48 captive as would be understood by one skilled in the art).

Receiver 48 includes a receiver surface 50 in sliding contact with one or more portions of crown surface 46. In one form, receiver surface 50 is a load bearing surface. In one form, receiver surface 50 is spherical. In other embodiments, receiver surface 50 may not be spherical, but may be any shape having spherical and/or non-spherical portions that are suited to the particular application. Receiver surface 50 may be an interrupted surface. Crown surface 46 and receiver surface 50 are operable to slide relative to each other. In the form of spherical surfaces, crown surface 46 and receiver surface 50 permit displacement in the form of rotation of crown 44 and housing 30 about an axis that is perpendicular to the rotation of rotor 36. The rotation results from crown surface 46 sliding against receiver surface 50. In some embodiments, crown 44 and/or bearing housing 30 may include anti-rotation features, e.g., such as one or more pins 45 (or slots) that engage respective mating slots 47 (or pins) in receiver 48 or static structure 38 to prevent the rotation of housing 30 about the axis of rotation of rotor 36.

Crown 44 is a movable component of mount 32, whereas receiver 48 is a static component of mount 32. In one form, mount 32 is a spherical bearing. Self-aligning foil bearing mount 32 is operative to align foil bearing 28 with the axis of rotor 36. In particular, self-aligning foil bearing mount 32 is operable to self-align by displacing crown 44 relative to receiver 48. More particularly, crown 44 is operable to rotate in a direction perpendicular to the axis of rotation of rotor 36 to self-align bearing 28. In one form, the rotation of the movable component (which, in the present non-limiting example is crown 44) is rotation of the entirety of the movable component, i.e., as opposed to a flexible mount component that flexes to allow a rotation of part of the flexible mount structure. Hence, the self-alignment of self-aligning foil bearing mount 32 is not achieved by flexure of mount 32 or any of its components.

The operation of foil bearing 28 is dependent upon maintaining the hydrodynamic air film between rotor 36 and top foil 42 to prevent contact between rotor 36 and top foil 42 during normal engine 10 operation. In order to generate the hydrodynamic air film, it is preferable that the axis of rotation of rotor 36 be aligned with the geometric centerline of bearing 28, e.g., so that the hydrodynamic loading on top foil 42 and the air film thickness are generally uniform along the operating length of bearing 28, e.g., the left to right direction in the depiction of FIG. 2.

Figure 3:
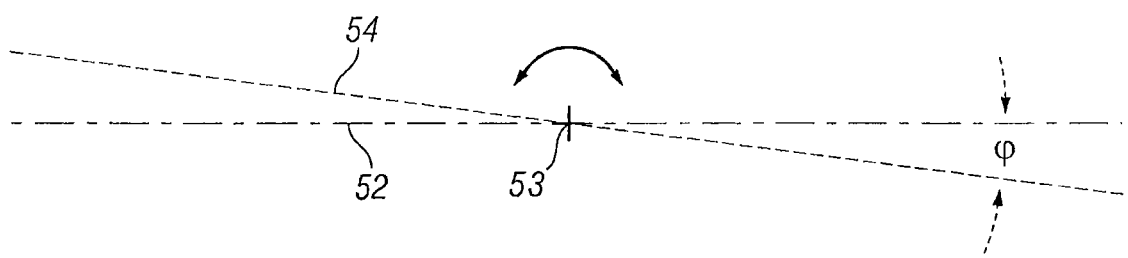
FIG. 3 depicts a skewed relationship between an axis of rotation of a gas turbine engine rotor and a centerline of a foil bearing.

Referring now to FIG. 3 in conjunction with FIGS. 1 and 2, an axis of rotation 52 of rotor 36 and a geometric centerline 54 of bearing 28 are depicted as being skewed with respect to each other at an angle Φ. Referring to FIG. 3, the convex crown 44 rotates about an axis of rotation 53 that is perpendicular to the axis of rotation 52 of the rotor 36. In FIG. 3, the axis of rotation of the convex crown 44 is represented by a plus sign, indicating that the axis 53 is going into the paper. The skewed axes result in a non-uniform loading on top foil 42 and a non-uniform hydrodynamic air film thickness along the operating length of bearing 28, which reduces foil bearing 28 performance. It is preferable that the skew angle Φ be small or zero so as to promote a uniform hydrodynamic air film pressure along the operating length of bearing 28 to maximize the load bearing capacity of foil bearing 28. Various factors may adversely effect the angular relationship between receiver surface 50 and centerline 52. For example engine 10 component tolerances may generate misalignment between the radial positions of bearing B and foil bearing 28, resulting in a non-zero skew angle Φ.

Because crown surface 46 is permitted to slide against receiver surface 50, self-aligning foil bearing mount 32 has only a limited ability to react moment loading. The ability of mount 32 to react a moment is based on the amount of friction between surfaces 44 and 50. The amount of friction may be controlled by various means, including controlling the tightness or looseness of the fit between surfaces 44 and 50, as well as by selection of the materials and/or coatings used on crown 44 and receiver 48. In one form, the amount of friction is controlled, by design, to allow the non-uniform loading on top foils 42 that results from skew angle Φ to be sufficient to overcome the frictional load and impart rotation of crown 44 relative to receiver 48 to reduce skew angle Φ. In one form, the amount of reduction of skew angle Φ is based primarily on the compliance of foil bearing 28 and the friction between surfaces 44 and 50, and may vary with the application. In some embodiments, loads transmitted from rotor 36 to snubbers 34 due to skew angle Φ may be employed to impart rotation of crown 44 relative to receiver 48 to reduce skew angle Φ. In various embodiments, self-aligning foil bearing mount 32, e.g., crown 44 and receiver 48, may be dimensioned so as to provide a desired operating clearance. In some embodiments, compliant springs may be employed to provide a positive fit. In some embodiments, coatings may be employed, e.g., on crown surface 46 and/or receiver surface 50, e.g., to reduce friction and wear, depending on the needs of the particular application. One example of a suitable material for use as crown surface 46 and/or receiver surface 50 in some embodiments is Graphalloy®, available from the Graphite Metallizing Corporation of Yonkers, N.Y., USA.

Snubbers 34 are operative to transmit rotor 36 loads to static structure 38. In one form, snubbers 34 are configured to limit the deflection of bump foil 40, e.g., to prevent or reduce damage to bump foil 40 during dynamic loading events. In one form, snubbers 34 include openings or slots (not shown) to permit cooling air to pass through snubbers 34 and bump foil 40. In other embodiments, cooling air may be provided to snubbers 34 and/or bump foil 40 via one or more other schemes in addition to or in place of openings or slots in snubbers 34. In still other embodiments, cooling air may not be provided. In one form, snubbers 34 are operative to transmit rotor 36 loads to static structure 38 in parallel with foil bearing 28, thereby sharing the rotor loads with foil bearing 28. In one form, the rotor loads are radial loads. In other embodiments, snubbers 34 may be structured transmit thrust loads in addition to or in place of radial loads. In some embodiments, snubbers 34 may not be employed. In embodiments that employ snubbers 34, snubbers 34 share the rotor 36 loads with foil bearing 28 under transient operating conditions. For example, when foil bearing 28 design loads are exceeded, snubbers 34 rub against rotor 36 to react rotor 36 loads. Snubbers 34 may be formed of metallic and/or composite materials. Although two snubbers 34 are depicted in FIG. 2, it will be understood that in other embodiments, any number of snubbers 34 may be employed. In some embodiments, only a single snubber 34 may be employed, e.g., at one end of bump foil 40 and/or top foil 42; or in between a split bump foil 40 and/or a split top foil 42. In various embodiments, one or more snubbers 34 may be positioned opposite rotor 36 behind top foil 42, e.g., whereby transient rotor 36 loads are first transmitted through top foil 42, and then from top foil 42 to snubber(s) 34. In one form, snubbers 34 are made from a carbon based material, such as steel. In other embodiments, a carbon-fiber composite may be employed. The material for snubbers 34 may vary with the needs of the application, and in various embodiments may be, for example, any suitable metallic, intermetallic and/or composite material. In some embodiments, one or more coatings, e.g., such as alcrona (AlCrN) and/or other coatings may be employed on snubbers 34, e.g., to reduce friction and wear, depending on the needs of the particular application. In some embodiments, snubbers 34 may include a portion made from, layered with and/or otherwise treated with a low friction material, an example of which is Graphalloy®. In other embodiments, other materials that meet the requirements of the particular application may be employed. Design considerations include operating temperatures, friction characteristics, oxidation resistance, heat transfer and dissipation capabilities, and mechanical and thermal loading parameters. Other suitable materials include, for example, stainless steel or iron. Suitable materials for rotor 36, i.e., the portions of rotor 36 that are rubbed by snubbers 34, may include, for example, any suitable metallic (e.g., nickel based alloys and/or iron-based alloys), intermetallic and/or composite material. In some embodiments, one or more coatings, e.g., such as alcrona (AlCrN) and/or other coatings may be employed on rotor 36, e.g., to reduce friction and wear, depending on the needs of the particular application. In some embodiments, rotor 36 may include a portion made from, and/or may be layered with and/or otherwise treated with a low friction material, an example of which is Graphalloy®. In some embodiments, the materials for snubbers 34 and rotor 36 may be selected to have a similar coefficient of thermal expansion. In one form, the use of snubbers 34 to share rotor 36 loads with foil bearing 28 allows foil bearing 28 to be sized for a lower design load, while retaining the capability to handle short duration transient peak loads. By being sized for a lower design load than that which would be required absent the use of snubbers 34, foil bearing 28 may be smaller and lighter than otherwise.

Embodiments of the present invention include a gas turbine engine, comprising: a compressor; a turbine; a static structure; a foil bearing system operative to transmit rotor loads from at least one of the compressor and the turbine to the static structure, wherein the foil bearing system includes a foil bearing and a self-aligning foil bearing mount coupled to the foil bearing, wherein the self-aligning foil bearing mount is operative to align the foil bearing with an axis of rotation of the at least one of the compressor and the turbine; and a snubber operative to transmit rotor loads from at least one of the compressor and the turbine to the static structure in parallel with the foil bearing.

In a refinement, the self-aligning foil bearing mount includes a static component and a movable component, and wherein the self-aligning foil bearing mount is operable to self-align by displacing the movable component relative to the static component.

In another refinement, the movable component is operable to rotate relative to the static component.

In yet another refinement, rotation of the movable component is rotation of the entire movable component.

In still another refinement, the static component includes a first surface; wherein the movable component includes a second surface in sliding contact with the first surface; and wherein displacement of the movable component relative to the static component includes the second surface sliding against the first surface.

In yet still another refinement, self-alignment is not achieved by flexure of the self-aligning foil bearing mount.

In a further refinement, the self-aligning foil bearing mount is a spherical bearing.

In a yet further refinement, the engine includes a shaft coupled to at least one of the compressor and the turbine, wherein rotor loads are transmitted from the shaft through the foil bearing, and from the foil bearing to the static structure via the selfaligning foil bearing mount.

In a still further refinement, the shaft couples the compressor to the turbine.

In a yet still further refinement, the engine includes a rotating journal and a housing disposed opposite to the rotating journal, wherein the snubber is operative to limit the proximity of the housing relative to the journal.

Embodiments of the present invention include a gas turbine engine, comprising: a rotor; a static structure; a foil bearing system operative to transmit rotor loads from the rotor to the static structure, wherein the foil bearing system includes: a foil bearing; and a self-aligning foil bearing mount operative to align the foil bearing with an axis of rotation of the rotor, wherein the self-aligning foil bearing mount has a static component and a movable component; and wherein the self-aligning foil bearing mount is operable to self-align with the axis of rotation of the rotor by sliding displacement of the movable component relative to the static component.

In a refinement, the self-aligning foil bearing mount is a spherical bearing.

In another refinement, the engine further includes a snubber operative to transmit rotor loads from the rotor to the static structure in parallel with the foil bearing.

In yet another refinement, the engine also includes a bearing housing for housing the foil bearing, wherein the snubber is positioned within the bearing housing.

In still another refinement, the snubber is positioned adjacent to the bearing housing.

In yet still another refinement, the snubber is formed of a composite material.

In a further refinement, the foil bearing is a compliant foil radial air bearing.

Embodiments of the present invention include a foil bearing system for a gas turbine engine, comprising: a foil bearing operative to transmit rotor loads from a rotor of the gas turbine engine to a static structure of the gas turbine engine; and means for aligning the foil bearing with an axis of rotation of the rotor.

In a refinement, the foil bearing system further includes means for sharing the rotor loads with the foil bearing.

In another refinement, the means for aligning includes a spherical bearing.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. In a foil bearing system for transmitting rotor loads from a rotor to a static structure having:
    a foil bearing surrounding a rotatable shaft;
    a housing surrounding the foil bearing; and
    a bearing mount affixed to the static structure and surrounding the housing,
    a method of self-aligning the foil bearing with the axis of rotation of the shaft comprising:
    providing a crown extending radially outward having a convex surface circumferentially disposed about a portion of the housing;
    providing a receiver having a concave surface circumferentially disposed about a portion of the bearing mount; and
    slideably mating the convex surface of the crown with a concave surface of the bearing mount to thereby permit rotation of the housing about an axis that is perpendicular to the axis of rotation of the shaft.

2. The method of claim 1 wherein the rotor is at least one of a compressor rotor or a turbine rotor.

3. The method of claim 1 wherein the convex surface of the crown is spherical in axial cross-section.

4. The method of claim 3 wherein the foil bearing is preloaded against the shaft.

5. The method of claim 4 wherein the crown is integral with the housing.

6. The method of claim 5 wherein said receiver is split.

7. A foil bearing system for a turbine engine comprising:
at least one foil bearing and a housing disposed between a rotor of the turbine engine and a static structure of the turbine engine, said housing having a convex crown circumferentially disposed about an axis of rotation of said rotor,
a bearing mount affixed to said static structure, said bearing mount having a concave receiver,
wherein said convex crown is slideably mated with said concave receiver to thereby permit rotation of said housing about an axis that is perpendicular to the axis of rotation of said rotor to thereby self-align said foil bearing to the axis of rotation of said rotor.

8. The system of claim 7 wherein said convex crown and said concave receiver comprise spherical surfaces in axial cross-section.

9. The system of claim 7 wherein a radially-outward surface of said convex crown has a friction reducing coating.

10. The system of claim 7 wherein said at least one foil bearing comprises a bump foil and a top foil.

11. The system of claim 10 wherein said top foil is preloaded against said rotor.

12. The system of claim 7 wherein said housing is adapted to rotate about an axis that is perpendicular to the axis of rotation of said rotor to thereby effect self-alignment of said convex crown to said concave receiver.

13. The system of claim 8 wherein the convex crown is formed separately from and affixed to the housing.

14. A system comprising:
a rotor;
a static structure;
a foil bearing circumferentially disposed about said rotor;
a housing circumferentially disposed about said foil bearing, said housing comprising a convex crown extending radially outward; and
a bearing mount affixed to said static structure circumferentially disposed about said housing, said bearing mount comprising a concave recess,
wherein said housing is positioned so that said convex crown is mated with said concave recess to permit sliding displacement between said housing and said bearing mount to thereby permit rotation of said housing about an axis that is perpendicular to the axis of rotation of said rotor.

15. The system of claim 14 wherein said convex crown and said concave recess comprise spherical surfaces in axial cross-section.

16. The system of claim 15 wherein said bearing mount is split.

17. The system of claim 16 wherein said bearing mount is secured to said static structure by a threaded nut.

18. The system of claim 15 wherein said bearing mount is integral with said static structure.

19. The system of claim 15 wherein said convex crown is integral to said housing.

20. The system of claim 19 wherein said foil bearing is preloaded against said rotor.

* * * * *